(12) United States Patent
Schachtely et al.

(10) Patent No.: US 7,842,269 B2
(45) Date of Patent: Nov. 30, 2010

(54) PYROGENICALLY PREPARED SILICON DIOXIDE COMPACTED TO GIVE CRUSTS

(75) Inventors: Uwe Schachtely, Kahl am Main (DE); Ralph Hofmann, Buchen (DE); Günter Stein, Nidderau (DE); Roland Schaffer, Linsengericht (DE); Rainer Friehmelt, Köln (DE)

(73) Assignee: Evonik Degussa GmbH, Essen (DE)

( * ) Notice: Subject to any disclaimer, the term of this patent is extended or adjusted under 35 U.S.C. 154(b) by 370 days.

(21) Appl. No.: 12/095,650

(22) PCT Filed: Jan. 4, 2007

(86) PCT No.: PCT/EP2007/050064

§ 371 (c)(1), (2), (4) Date: May 30, 2008

(87) PCT Pub. No.: WO2007/085511

PCT Pub. Date: Aug. 2, 2007

(65) Prior Publication Data

US 2010/0179269 A1    Jul. 15, 2010

(30) Foreign Application Priority Data

Jan. 25, 2006   (EP) .................. 06100825

(51) Int. Cl.
C01B 33/00 (2006.01)
(52) U.S. Cl. ...................... 423/335; 423/337
(58) Field of Classification Search ................. 423/335, 423/337
See application file for complete search history.

(56) References Cited

U.S. PATENT DOCUMENTS

| 3,632,247 | A | * | 1/1972 | Loffler | ................ 425/135 |
| 4,877,595 | A | | 10/1989 | Klingle | |
| 5,776,240 | A | * | 7/1998 | Deller et al. | ............ 106/482 |
| 2004/0024070 | A1 | | 2/2004 | Michael | |

FOREIGN PATENT DOCUMENTS

| DE | 1129459 B | 5/1962 |
| DE | 1807714 B1 | 6/1970 |
| DE | 3741846 A1 | 1/1989 |
| DE | 19961933 A1 | 7/2001 |
| EP | 0573797 A2 | 12/1993 |
| EP | 0618065 A | 10/1994 |

OTHER PUBLICATIONS

International Search Report.
International Preliminary Report on Patentability/Written Opinion.

* cited by examiner

*Primary Examiner*—Timothy C Vanoy
*Assistant Examiner*—Michelle Hou
(74) *Attorney, Agent, or Firm*—Smith, Gambrell & Russell, LLP (57) ABSTRACT

Pyrogenically prepared silicon dioxide is compacted to give crusts, in that it is subject to preliminary de-aeration, and is compacted to give crusts, and the crusts are broken and, if appropriate, classified. The tamped bulk density (to DIN EN ISO 787-11) of the silicon dioxide compacted to give crusts is from 185 to 700 g/l. It can be used as filler in rubber mixtures.

6 Claims, 8 Drawing Sheets

Diagram of dust sedimentation tester

Sample H: Inventive crusts

Sample J: Subject to preliminary bulk-density increase according to EP 0 280 851

Figure 8

PYROGENICALLY PREPARED SILICON DIOXIDE COMPACTED TO GIVE CRUSTS

INTRODUCTION AND BACKGROUND

The invention relates to pyrogenically prepared silicon dioxide compacted to give crusts, to a process for the production of the crusts from pyrogenically prepared silicon dioxide, and also to their use.

It is known that pyrogenically prepared silicon dioxide can be prepared by means of high temperature or flame hydrolysis from $SiCl_4$ or from other volatile silicon compounds (Ullmann's Enzyklopädie der technischen Chemie [Ullmann's encyclopaedia of industrial chemistry], 4th Edition, Vol. 21, page 464 (1982)).

Features of pyrogenically prepared silicon dioxides are extremely fine particles, low bulk density, high specific surface area, very high purity, spherical particle shape and the absence of pores.

Compacting of pyrogenically prepared silicon dioxide without binder is difficult because pyrogenically prepared silicon dioxide is very dry and there are no capillary forces that can bring about binding of the particles.

Pyrogenically prepared silicon dioxide often has high surface charge which acts electrostatically to make agglomeration more difficult. Furthermore, pyrogenically prepared silicon dioxide has a maximum moisture content of 1%.

It is known that colloidal silicon dioxide, which derives from the exhaust gas from silicon smelting ovens, can be subject to bulk-density increase by passing the colloidal silicon dioxide almost horizontally through a pair of vertically arranged compression rollers (U.S. Pat. No. 5,160,470).

That reference makes no mention of pyrogenically prepared silicon dioxide.

It is known that fine-particle substances can be subject to bulk-density increase by means of two screw compactors arranged at right angles to one another (U.S. Pat. No. 3,664,385).

It is known that powders, such as silica, can be subject to bulk-density increase by means of vacuum rolls arranged in groups (U.S. Pat. No. 3,632,247).

It is known that powders can be subject to bulk-density increase by means of a screw compactor and that the air escaping during that process can be returned in order to reduce powder loss (U.S. Pat. No. 5,052,874).

For certain applications and transport methods it is known that pyrogenically prepared silicon dioxides can be subject to bulk-density increase or can be formed to give pellets.

It is known that pyrogenically prepared silicon dioxide can be subject to bulk-density increase by means of the apparatus according to U.S. Pat. No. 5,052,874 (U.S. Pat. No. 6,156,285).

It is known that pyrogenically prepared silicon dioxide can be subject to bulk-density increase by using a compactor screw which has decreasing pitch (U.S. Pat. No. 4,326,852).

It is known that pyrogenically prepared oxides, such as pyrogenically prepared silicon dioxide, can be subject to bulk-density increase by means of gas-permeable belts (U.S. Pat. No. 4,325,686). The density achieved by this known process is less than 100 g/l.

U.S. Pat. No. 4,325,686, column 3, discloses that pyrogenically prepared silicon dioxide (fumed silica) can be subject to bulk-density increase by means of the apparatus according to U.S. Pat. Nos. 3,838,785, 3,742,566, 3,762,851 and 3,860,682. The maximum tamped bulk density given by this process is 180 g/l.

The known processes do not give defined compactates.

It is known that pyrogenically prepared silicon dioxide can be subject to bulk-density increase by means of a pressure-belt filter (EP 0280851 B1). However, this process likewise does not give defined compactates.

It is known that metal oxides whose primary particle size is from 1 to 500 µm can be formed to give compactates and that these compactates can be separately welded into foils in vacuo. These vacuum panels thus manufactured to a given specification can be used for thermal insulation, for example in refrigerators (U.S. Pat. No. 6,132,837).

It is known that pyrogenically prepared silicon dioxide can be subject to bulk-density increase by means of a transport screw (EP 0010655 A1). Again, this process does not give defined compactates.

It is moreover known that pyrogenically prepared silicon dioxide can be moulded to give pellets, by dispersing the silicon dioxide in water and spray-drying the material. These pellets can be used as catalyst supports (DE 196 01 415).

It is known that precipitated silica whose moisture content cannot be below 1% can be subject to bulk-density increase by means of filter rolls (DE B 1807714). The disadvantage of this process is that it can achieve bulk-density increase only when a silica comprises water.

SUMMARY OF THE INVENTION

It was an object to subject pyrogenically prepared silicon dioxide to bulk-density increase in such a way as to give a flowable product with defined particle size, with good metering capability, with high bulk density and with low dust content.

The invention provides a pyrogenically prepared silicon dioxide compacted to give crusts, characterized in that its tamped bulk density (to DIN EN ISO 787-11) is from 185 to 700 g/l.

The tamped bulk density can be from 191 to 700 g/l, preferably from 200 to 700 g/l.

In one particularly preferred embodiment of the invention, the tamped bulk density (to DIN EN ISO 787-11) can be from 200 to 450 g/l.

According to the invention, the tamped bulk density of a hydrophilic pyrogenically prepared silicon dioxide compacted to give crusts can preferably be from 191 to 700, in particular from 200 to 700, and also from 200 to 450 g/l.

The tamped bulk density of a hydrophobic pyrogenically prepared silicon dioxide compacted to give crusts can be from 201 to 700 g/l, preferably from 210 to 700 g/l, especially preferred from 210 to 450 g/l.

Crusts are the term used for the somewhat strip-like intermediate products which are produced by pressure on the starting material during roll compacting. They are comminuted in a second step.

The properties of the crusts can be influenced via the process variables, e.g. the process control system provided, the compacting force, the width of the gap between the two rolls and the pressure retention time, which is adjusted via an appropriate alteration in the rotation rates of the compression rolls.

Compacting means achievement of a bulk-density increase by mechanical means without addition of binders. In one particular embodiment of the invention, the crusts have a clearly defined shape, and the size distribution here can be adjusted by means of sieving.

The inventive pyrogenically prepared silicon dioxide compacted to give crusts is very stable during transport.

The invention further provides a process for production of the pyrogenically prepared silicon dioxide whose tamped bulk density (to DIN EN ISO 787-11) is from 185 to 700 g/l compacted to give crusts, characterized in that pyrogenically prepared silicon dioxide is subject to preliminary de-aeration and, respectively, to bulk-density increase, and is compacted to give crusts, and the crusts are broken and, if appropriate, classified.

DETAILED DESCRIPTION OF INVENTION

Figure 1:
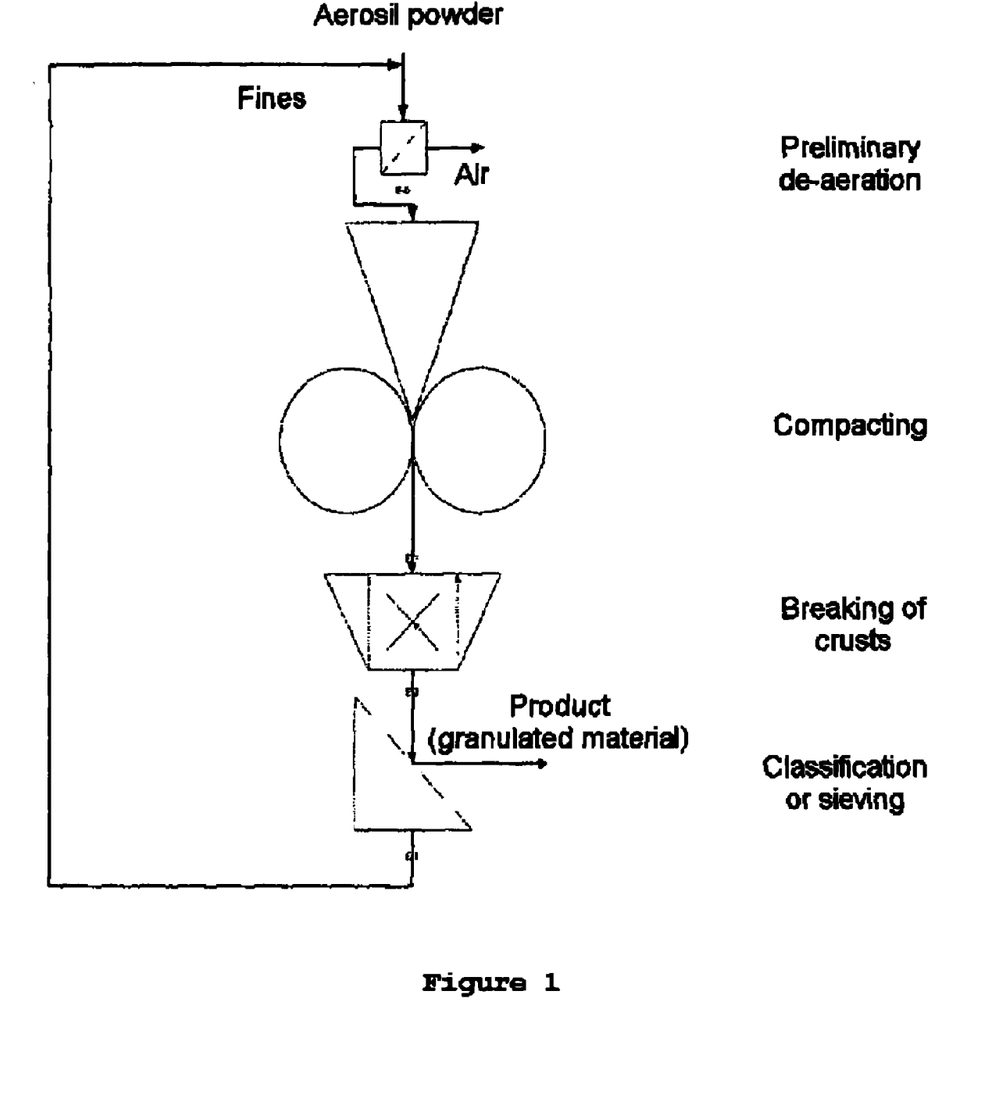
FIG. 1 is a diagram of the inventive process.

According to FIG. 1, the pyrogenically prepared silicon dioxide is subject to preliminary bulk-density increase or is de-aerated by means of known methods and apparatuses in the "preliminary de-aeration" step. This step is needed if pyrogenically prepared silicon dioxide is used which is not subject to bulk-density increase, possibly having been freshly prepared.

If a pyrogenically prepared silicon dioxide is used which has been previously subject to preliminary bulk-density increase, this preliminary de-aeration step can be omitted.

The pyrogenically prepared silicon dioxide which has been subject to preliminary de-aeration is subject to bulk-density increase (compacted) to the desired tamped bulk density in the "compacting" step.

After compacting, the crusts are broken. Classification or sieving can then be carried out, if appropriate.

The fines produced during sieving can be returned to the preliminary de-aeration step.

According to the invention, the starting material for preliminary de-aeration can comprise a silicon dioxide which has not been subject to bulk-density increase, or which has been subject to preliminary bulk-density increase.

The preliminary de-aeration process can be carried out prior to transport or during transport to the compacting process.

Prior to transport to the compacting process, the preliminary de-aeration process can be carried out by means of a pipe to which a vacuum is applied and which is composed of a sintered material, e.g. sintered metal.

The preliminary de-aeration process can moreover be carried out in the transport screw, and the transport screw here may be downstream of the apparatus which encompasses a pipe to which vacuum is applied.

In another embodiment of the invention, the transport screw can be used as the sole apparatus for the preliminary de-aeration process.

The preliminary de-aeration process can moreover be carried out by means of a transport screw arranged within a pipe to which vacuum is applied. The pipe to which vacuum is applied can be composed of a sintered jacket, e.g. sintered metal.

If the apparatus is composed of a preliminary deaeration pipe, e.g. of a pipe to which vacuum is applied, and of a downstream transport screw, the preliminary de-aeration process can be carried out in the pipe, if a silicon dioxide is used which has not been subject to bulk-density increase.

If a silicon dioxide which has been subject to preliminary bulk-density increase is used, the preliminary de-aeration process can likewise be carried out in the pipe. It is also possible to omit this preliminary de-aeration step.

If exclusively the transport screw is used for the preliminary de-aeration process, it is necessary to use silicon dioxide which has been subject to preliminary bulk-density increase.

If the preliminary de-aeration process uses the apparatus which has a transport screw within a pipe to which vacuum is applied, it is possible to use either silicon dioxide which has not been subject to bulk-density increase or else silicon dioxide which has been subject to preliminary bulk-density increase.

The preliminary de-aeration of the pyrogenically prepared silicon dioxide can moreover take place by means of filtration on a filter medium, e.g. a cloth or sintered material, e.g. sintered metal, sintered plastic, sintered ceramic, porous glass, with continuous filtercake removal via, for example, a conveying screw or a scraper. In one embodiment of the invention, a sintered metal pipe can be used with a metering screw.

The preliminary de-aeration can moreover take place by means of sedimentation, where the break-up of solid bridges is promoted via additional use of vibration or sound or via slow stirring.

The starting material used can be a hydrophilic, pyrogenically prepared silicon dioxide or a hydrophobic, pyrogenically prepared silicon dioxide.

The hydrophobic pyrogenically prepared silicon dioxide can be prepared by means of surface modification.

One or more compounds from the following group can be used for the surface modification process:

a) organosilanes of the type $(RO)_3Si(C_nH_{2n+1})$ and $(RO)_3Si(C_nH_{2n-1})$
  R=alkyl, e.g. methyl, ethyl, n-propyl, iso-propyl, butyl
  n=from 1 to 20 b) organosilanes of the type $R'_x(RO)_ySi(C_nH_{2n+1})$ and $R'_x(RO)_ySi(C_nH_{2n-1})$
  R=alkyl, e.g. methyl, ethyl, n-propyl, iso-propyl, butyl
  R'=alkyl, e.g. methyl, ethyl, n-propyl, iso-propyl, butyl
  R'=cycloalkyl
  n=from 1 to 20
  x+y=3
  x=1.2
  y=1.2 c) haloorganosilanes of the type $X_3Si(C_nH_{2n+1})$ and $X_3Si(C_nH_{2n-1})$
  X=Cl, Br
  n=from 1 to 20 d) haloorganosilanes of the type $X_2(R')Si(C_nH_{2n+1})$ and $X_2(R')Si(C_nH_{2n-1})$
  X=Cl, Br
  R'=alkyl, e.g. methyl, ethyl, n-propyl, iso-propyl, butyl
  R'=cycloalkyl
  n=from 1 to 20 e) haloorganosilanes of the type $X(R')_2Si(C_nH_{2n+1})$ and $X(R')_2Si(C_nH_{2n-1})$
  X=Cl, Br
  R'=alkyl, e.g. methyl, ethyl, n-propyl, iso-propyl, butyl
  R'=cycloalkyl
  n=from 1 to 20 f) organosilanes of the type $(RO)_3Si(CH_2)_m$—R'
  R=alkyl, e.g. methyl, ethyl, propyl
  m=from 0.1 to 20

R'=methyl, aryl (e.g. —C$_6$H$_5$, substituted phenyl radicals) —C$_4$F$_9$, OCF$_2$—CHF—CF$_3$, —C$_6$F$_{13}$, —O—CF$_2$—CHF$_2$
—NH$_2$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$,   —NH—COO—CH$_2$—CH$_3$, —NH—(CH$_2$)$_3$Si—(OR)$_3$
—S$_x$—(CH$_2$)$_3$Si(OR)$_3$, where X=from 1 to 10 and R can be alkyl, e.g. methyl, ethyl, propyl, butyl
—SH
—NR'R"R'" (R'=alkyl, aryl; R"=H, alkyl, aryl; R'"=H, alkyl, aryl, benzyl, C$_2$H$_4$NR""R""', where R""=A, alkyl and R""'=H, alkyl)

g) organosilanes of the type (R")$_x$(RO)$_y$Si(CH$_2$)$_m$—R'
R"=alkyl x+y=2
=cycloalkyl x=1.2
y=1.2
m=from 0.1 to 20
R'=methyl, aryl (e.g. —C$_6$H$_5$, substituted phenyl radicals) —C$_4$F$_9$, —OCF$_2$—CHF—CF$_3$, —C$_6$F$_{13}$, —O—CF$_2$—CHF$_2$,
—NH$_2$, —N$_3$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$,   —NH—COO—CH$_2$—CH$_3$, —NH—(CH$_2$)$_3$Si—(OR)$_3$
—S$_x$—(CH$_2$)$_3$Si(OR)$_3$, where X=from 1 to 10 and R can be methyl, ethyl, propyl, butyl
—SH—NR'R"R'" (R'=alkyl, aryl; R"=H, alkyl, aryl; R'"=H, alkyl, aryl, benzyl, C$_2$H$_4$NR""R""', where R""=A, alkyl and R""'=H, alkyl)

h) haloorganosilanes of the type X$_3$Si(CH$_2$)$_m$—R'
X=Cl, Br
m=from 0.1 to 20
R'=methyl, aryl (e.g. —C$_6$H$_5$, substituted phenyl radicals) —C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$,
—NH—CH$_2$—CH$_2$—NH$_2$
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$,   —NH—COO—CH$_2$—CH$_3$, —NH—(CH$_2$)$_3$Si—(OR)$_3$
—S$_x$—(CH$_2$)$_3$Si(OR)$_3$, where X=from 1 to 10 and R can be methyl, ethyl, propyl, butyl
—SH i) haloorganosilanes of the type (R)X$_2$Si(CH$_2$)$_m$—R'
X=Cl, Br
R=alkyl, e.g. methyl, ethyl, propyl
m=from 0.1 to 20
R'=methyl, aryl (e.g. —C$_6$H$_5$, substituted phenyl radicals) —C$_4$F$_9$, —OCF$_2$—CHF—CF$_3$, —C$_6$F$_{13}$, —O—CF$_2$—CHF$_2$—NH$_2$, —N$_3$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$,   —NH—COO—CH$_2$—CH$_3$, —NH—(CH$_2$)$_3$Si—(OR)$_3$,
where R can be methyl, ethyl, propyl, butyl
—S$_x$—(CH$_2$)$_3$Si(OR)$_3$, where R can be methyl, ethyl, propyl, butyl and X can be from 1 to 10
—SH j) haloorganosilanes of the type (R)$_2$XSi(CH$_2$)$_m$—R'
X=Cl, Br
R=alkyl, e.g. methyl, ethyl, propyl, butyl
m=from 0.1 to 20
R'=methyl, aryl (e.g. —C$_6$H$_5$, substituted phenyl radicals) —C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$,   —NH—COO—CH$_2$—CH$_3$, —NH—(CH$_2$)$_3$Si—(OR)$_3$
—S$_x$—(CH$_2$)$_3$Si(OR)$_3$, where X=from 1 to 10 and R can be methyl, ethyl, propyl, butyl
—SH k) silazanes of the type R=alkyl
R'=alkyl, vinyl l) cyclic polysiloxanes of the type D 3, D 4, D 5, where D 3, D 4 and D 5 are cyclic polysiloxanes having 3, 4 or 5 units of the type —O—Si(CH$_3$)$_2$—.
For example, octamethylcyclotetrasiloxane=D 4 m) polysiloxanes or silicone oils of the type m = 0, 1, 2, 3, . . . ∞
n = 0, 1, 2, 3, . . . ∞
u = 0, 1, 2, 3, . . . ∞
Y = CH$_3$, H, C$_n$H$_{2n+1}$
n = 1-20
Y = Si(CH$_3$)$_3$, Si(CH$_3$)$_2$H
    Si(CH$_3$)$_2$OH, Si(CH$_3$)$_2$(OCH$_3$)
    Si(CH$_3$)$_2$(C$_n$H$_{2n+1}$)
n = 1-20

R=alkyl, e.g. C$_n$H$_{2n+1}$, where n=from 1 to 20, aryl, e.g.
phenyl and substituted phenyl radicals, (CH$_2$)$_n$—NH$_2$, H
R'=alkyl, e.g. C$_n$H$_{2n+1}$, where n=from 1 to 20, aryl, e.g.
phenyl and substituted phenyl radicals, $(CH_2)_n$—$NH_2$, H
R"=alkyl, e.g. $C_nH_{2n+1}$, where n=from 1 to 20, aryl, e.g.
phenyl and substituted phenyl radicals, $(CH_2)_n$—$NH_2$, H
R'''=alkyl, e.g. $C_nH_{2n+1}$, where n=from 1 to 20, aryl, e.g.
phenyl and substituted phenyl radicals, $(CH_2)_n$—$NH_2$, H.

In one embodiment of the invention, the starting material used can comprise a pyrogenically prepared silicon dioxide subject to preliminary bulk-density increase.

When the pyrogenically prepared silicon dioxide used is not subject to bulk-density increase its tamped bulk density (to DIN EN ISO 787-11) can be smaller than 50 g/l, preferably from 20 to 30 g/l. The pyrogenically prepared silicon dioxide used which is subject to preliminary bulk-density increase can have a tamped bulk density (to DIN EN ISO 787-11) of from 50 to 190 g/l, preferably from 100 to 150 g/l, and the tamped bulk density here (to DIN EN ISO 787-11) of a hydrophobic pyrogenically prepared silicon dioxide subject to preliminary bulk-density increase can be from 90 to 120 g/l.

In the state not subject to bulk-density increase, the hydrophilic silicon dioxide used can have a tamped bulk density (to DIN EN ISO 787-11) smaller than 50 g/l, preferably from 20 to 30 g/l.

In the state subject to preliminary bulk-density increase, the hydrophilic silicon dioxide can have a tamped bulk density (to DIN EN ISO 787-11) of from 50 to 190 g/l, preferably from 100 to 150 g/l.

In the state subject to preliminary bulk-density increase, the hydrophobic silicon dioxide can have a tamped bulk density (to DIN EN ISO 787-11) of from 50 to 190 g/l, preferably from 90 to 120 g/l.

The primary particle size of the pyrogenically prepared silicon dioxide used can be from 5 to 50 nm and its BET surface area can be from 40 to 400 $m^2/g$, preferably from 100 to 250 $m^2/g$.

The water content of the pyrogenically prepared silicon dioxide used can be smaller than 1% by weight.

The pyrogenically prepared silicon dioxide can be subject to preliminary bulk-density increase by means of known processes and apparatuses. By way of example, the apparatuses according to U.S. Pat. Nos. 4,325,686, 4,877,595, 3,838,785, 3,742,566, 3,762,851, 3,860,682 can be used.

In one preferred embodiment of the invention, it is possible to use a pyrogenically prepared silicon dioxide which has been subject to preliminary bulk-density increase by means of a pressure-belt filter according to EP 0280851 B1 or U.S. Pat. No. 4,877,595.

By way of example, the transport of the pyrogenically prepared silicon dioxide to the compacting process can take place by means of a screw.

This transport consists in forcing the pyrogenically prepared silicon dioxide into the nip of the compacting rolls. If a conveying screw is not used, it is necessary to use a pyrogenically prepared silicon dioxide which has been subject to preliminary bulk-density increase.

If a conveying screw is used, the pyrogenically prepared silicon dioxide may not be subject to preliminary bulk-density increase, because preliminary de-aeration takes place here.

In order to achieve high bulk densities of the crusts, it is possible to use a conveying screw and a pyrogenically prepared silicon dioxide subject to preliminary bulk-density increase.

The conveying screw used can comprise a screw with decreasing volume or with increasing pitch or with decreasing diameter.

Surrounding the conveying screw there can be a pipe to which vacuum is applied. This pipe can be composed of a sintered jacket. The preliminary de-aeration of the silicon dioxide takes place here in the transport screw simultaneously with the transport into the nip.

Compacting to give crusts can take place by means of two rolls, of which one, or else both simultaneously, can have a de-aerating function.

It is preferable to use two compacting rolls, which can be smooth. They can also have a profile. The profile can be present either only on one compacting roll or else on both compacting rolls.

The profile can be composed of grooves parallel to the axis. As an alternative, it can be composed of recesses (depressions) of any desired shape, arranged in any desired manner.

In another embodiment of the invention, at least one of the rolls can be a vacuum roll. In this embodiment, the roll can have been covered with sintered metal.

In order to bring about the de-aeration function, the roll can have been produced from sintered metal or can have been covered with a filter medium, for example with a cloth.

If de-aeration of the pyrogenically prepared silicon dioxide is possible by means of the rolls, it is possible to omit the additional preliminary de-aeration which can take place in the conveying screw or in the feed pipe.

If the roll is used for preliminary de-aeration, the roll can have a smooth or profiled surface, and this surface can be only slightly grooved, in order to improve take-up of the product.

The compacting process should ensure uniform compression of the pyrogenically prepared silicon dioxide, in order to give crusts with uniform density.

Figure 2:
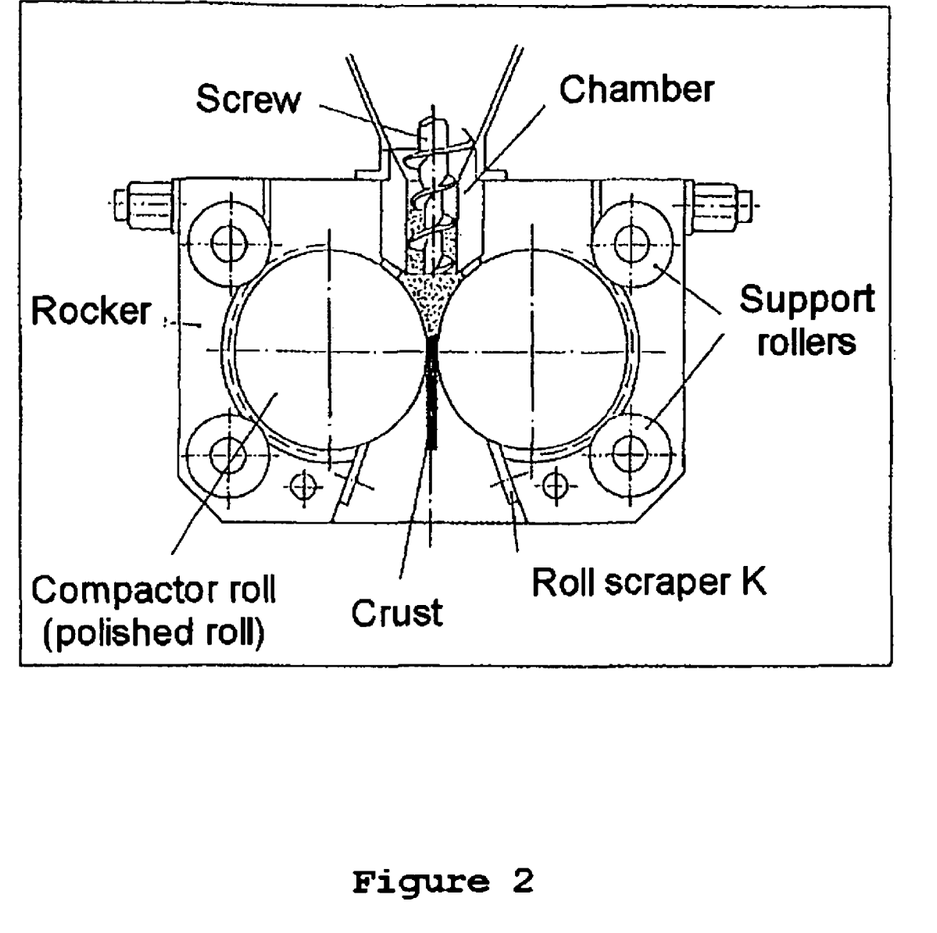
FIG. 2 illustrates apparatus used to carry out the compacting process of the invention.

Apparatus as shown in FIG. 2 can be used to carry out the compacting process.

According to FIG. 2, the pyrogenically prepared silicon dioxide is introduced by means of the screw 1 into the chamber 2 between the two rolls 3 and is pressed between the two rolls to give crusts.

The inventive process can moreover be carried out by using an apparatus as described in the document DE B 1807714.

It is preferable to use smooth rolls in the compacting process, in order to avoid grit. It is moreover possible to use one or two rolls composed of sintered material, e.g. sintered metal or sintered ceramic, by way of which de-aeration can take place.

After the compacting process, the crusts are broken. A sieving granulator can be used for this purpose, and its sieve mesh width prescribes the grain size. The mesh width can be from 250 μm to 20 mm.

For breaking of the crusts it is moreover possible to use an apparatus with two counter-rotating rolls with a defined gap, or a toothed roll.

The broken crusts can be classified by means of a sifter, a sieve or a classifier. The fines (particles smaller than 200 μm) can thereby be removed.

Sifters that can be used are cross-flow sifters, countercurrent baffle-type sifters.

A cyclone can be used as classifier.

The fines (particles smaller than 200 μm) removed during classification can be returned to the inventive process.

Determination of Tamped Bulk Density

Tamped bulk density was measured to DIN EN ISO 787-11. Prior to the measurements, the specimens were passed through a 5 mm sieve in order to break up large agglomerates and obtain reproducible measurements.

Determination of Dust Content

Dust content is determined to DIN 55992-2.

The comparative pyrogenic silica products subject to bulk-density increase by the apparatus according to EP 0 280 851 A1, and the inventive crusts, were passed through a 5 mm sieve prior to the measurements, in order to break up large agglomerates and obtain reproducible measurements.

Figure 3:
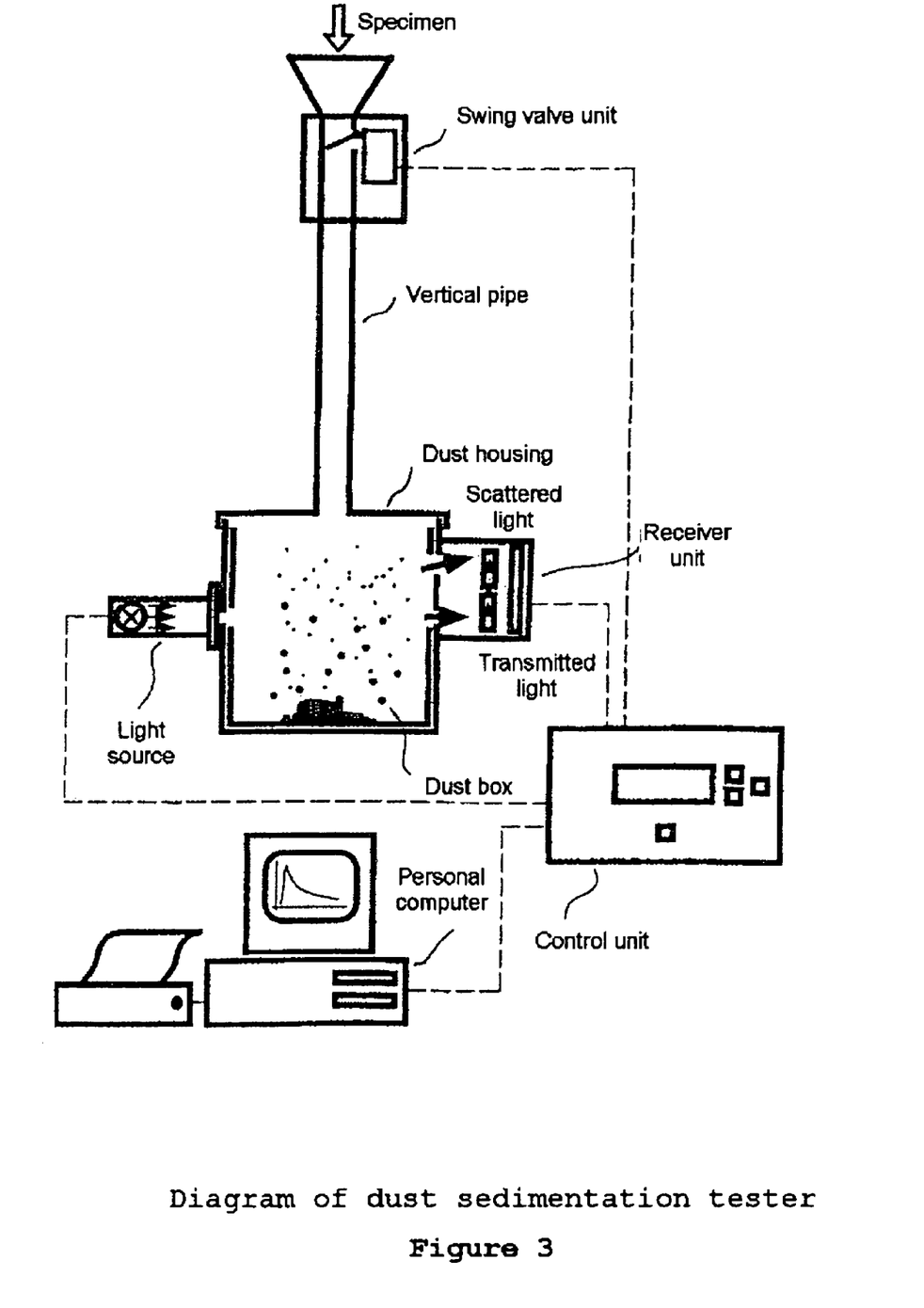
FIG. 3 is a diagram of the test device for direct contact determination.

FIG. 3 shows a diagram of the test device for determination of dust content.

To determine dust content, a weighed-out amount (3 g) of the inventive crusts or of the comparative product according to EP 0 280 851 A1 is charged to a feed system at the upper end of the vertical pipe. This has been sealed below by flaps prior to the start of the test. The end of the vertical pipe has been sealed. At the start of the test, this flap is opened for a certain period so that the specimen can drop into the vertical pipe. The specimen dissipates dust into the air during the drop and on impact, on the base of the vertical pipe. Air turbulence during the drop provides uniform distribution of the dust in the pipe. Sedimentation of the suspended material then begins. The light extinction brought about by the suspended material at the lower end of the vertical pipe is measured via a photometric sensor. The sedimentation curve is indicated by a PC as extinction as a function of time. Extinction is a measure of relative particle concentration.

From the curve of extinction as a function of time it is possible to determine the cumulative dust values. The cumulative dust values are determined as follows from the sedimentation curve measured from an initial time ta to the end of the test after 30 s:

$$I(ta) = \int_{ta}^{30s} E(t)dt$$

where $ta = 1s, 2s, 4s, 8s, 16s$

These cumulative dust values describe the amount of dust liberated. The cumulative dust value from 16 s to 30 s is also termed the "dust value". It contains information on fine dust or is a measure of fine dust content.

The cumulative dust value from 1 s to 30 s describes the total amount of dust, composed of coarse dust and fine dust.

The inventive crusts of a pyrogenic silica differ in these two values from pyrogenic silica subject to bulk-density increase by an apparatus according to EP 0 280 851 A1.

EXAMPLE

Comparison of the dust performance of pyrogenic silica subject to bulk-density increase in an apparatus according to EP 0 280 851 A1 with the inventive crusts of a pyrogenic silica. The BET surface area of both specimens is 150 m²/g.

Figure 7:
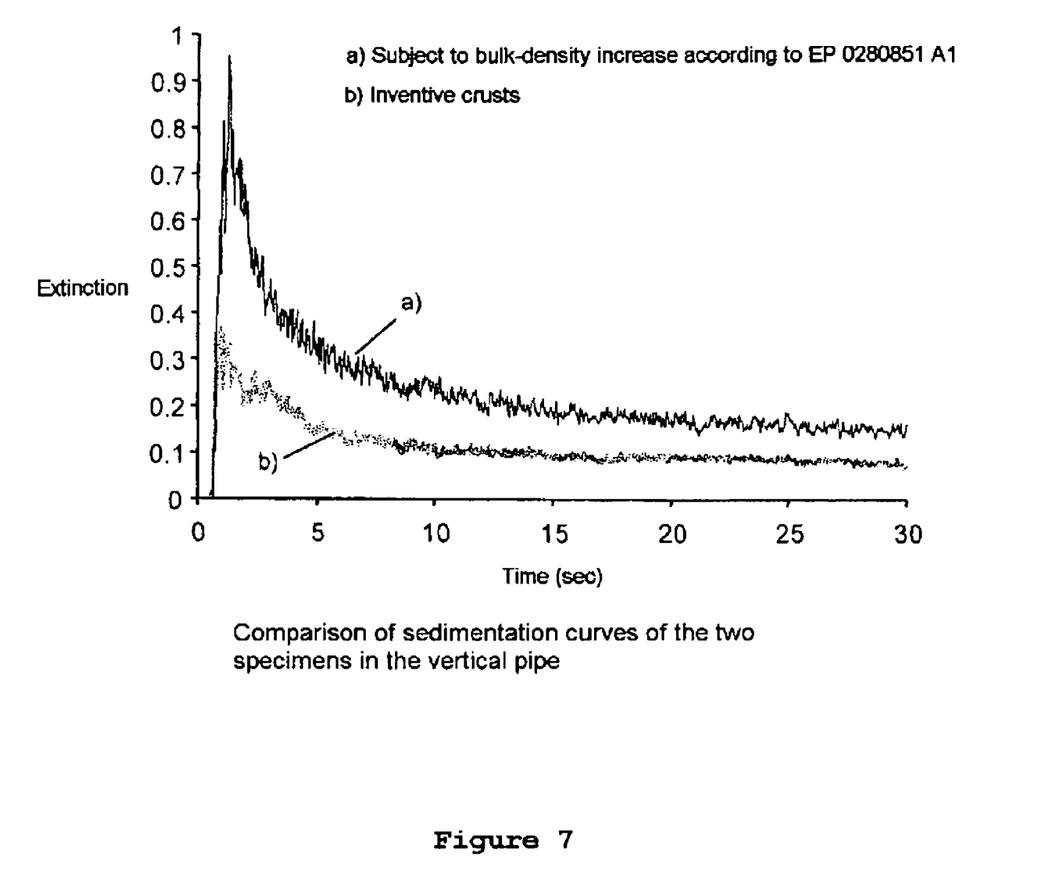
FIG. 7 is a graph of extinction coefficient with time.

FIG. 7 shows the curve of extinction as a function of time or of relative dust concentration during the determination described above of dust content of the two specimens. This curve shows that the inventive compactates sediment substantially more rapidly and that after 16 s there is less fine dust remaining in suspension than with pyrogenic silica subject to bulk-density increase according to EP 0 280 851 A1. Over the entire duration of the test, the inventive crusts liberate substantially less dust than does the pyrogenic silica subject to bulk-density increase according to EP 0 280 851 A1. Extinction assumes markedly lower numeric values in FIG. 7 for the inventive crusts.

TABLE 1

Comparison of total dust contents and fine dust contents (dust values = cumulative dust value from 1 s to 30 s and from 16 s to 30 s)

| | Dust value* I (1 s) (from eq. 1) [rel. conc. * s] | Dust value* I (16 s) (from eq. 1) [rel. conc. * s] |
|---|---|---|
| Pyrogenic silica, subject to bulk-density increase by apparatus according to EP 0 280 851 A1 | 207 | 62 |
| Inventive crusts of a pyrogenic silica | 113 | 40 |

*The statistical independence of the dust values of the two experimental products was demonstrated via the T test. 12 replicating experiments were carried out from each specimen.

The cumulative dust values in the determination described above of dust contents differ markedly from one another. Firstly, pyrogenic silica subject to bulk-density increase according to EP 0 280 851 A1 generates, with a I(1 s) value of 207, significantly more coarse and fine dust than the inventive crusts with a I(1 s) value of 113. Furthermore, the crusts have a fine dust value (I(16 s)) of 40, whereas pyrogenic silica subject to bulk-density increase by an apparatus according to EP 0 280 851 A1 has a substantially higher dust value: 62. That means that the inventive compacting process to give crusts can significantly reduce not only the total dust content but also the fine dust content when comparison is made with bulk-density increase according to EP 0 280 851 A1.

Figure 4:
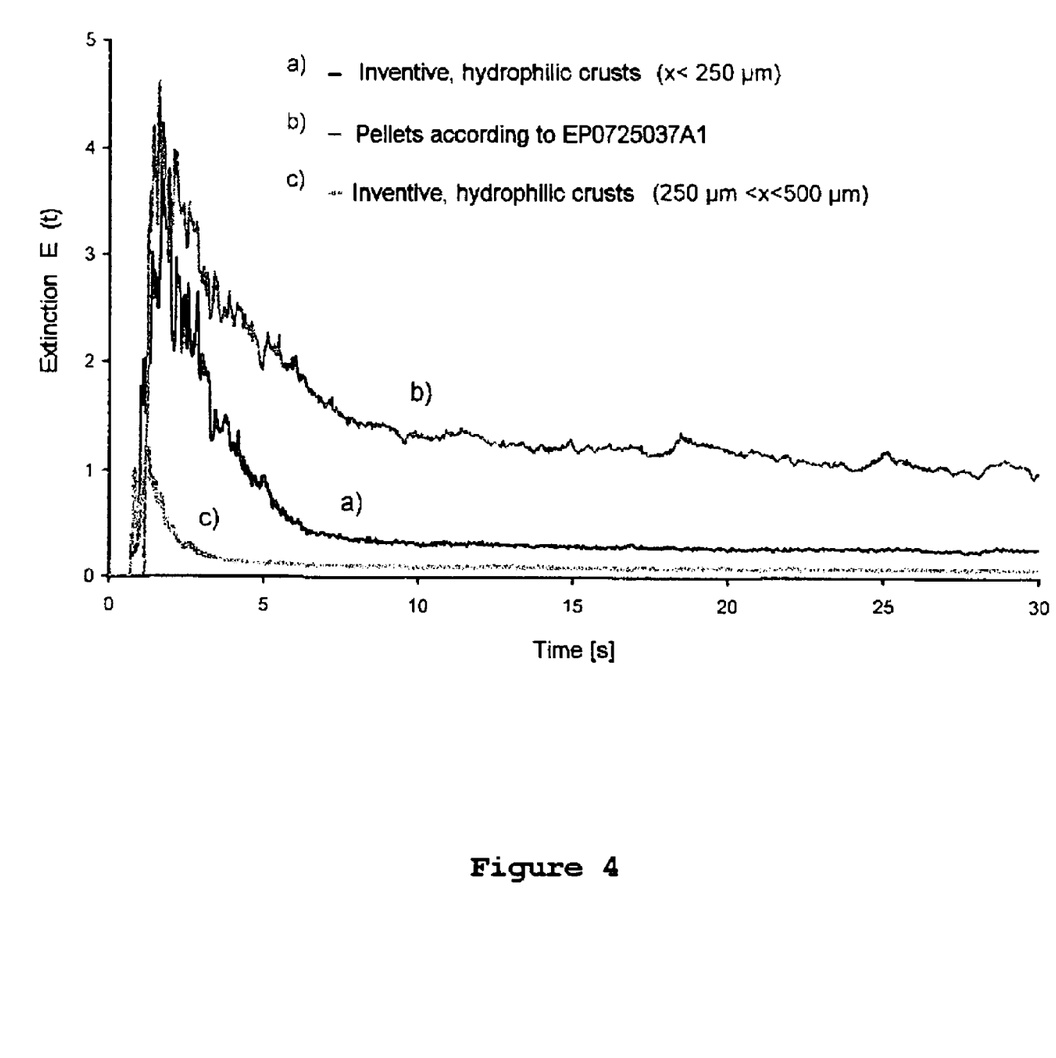
FIG. 4 is a graph of extinction coefficient versus time.

FIG. 4 compares the fine dust content of the pyrogenically prepared silicon dioxide compacted by means of the inventive process to give crusts and the fine dust contents of pyrogenic silicon dioxide subject to bulk-density increase in a known manner.

Starting materials used for the inventive process comprise a pyrogenically prepared silicon dioxide subject to bulk-density increase by means of the pressure-belt filter according to EP 0 280 851 B1.

FIG. 4 shows a measure of the particle size distribution and the average particle size of the loose powder and, respectively, of the loose crusts produced by the inventive process. It is apparent here that the inventive crusts of the pyrogenically prepared silicon dioxide sediment significantly better and generate significantly less dust than the granulated material according to EP 0 725 037 A1.

FIG. 4 moreover shows a measure of content of fine or suspended dust. It is apparent here that the content of suspended dust can be drastically reduced for the inventive crusts. In the case of granulated material according to EP 0 725 037 A1, a large proportion remains suspended for a very long time.

Figure 5:
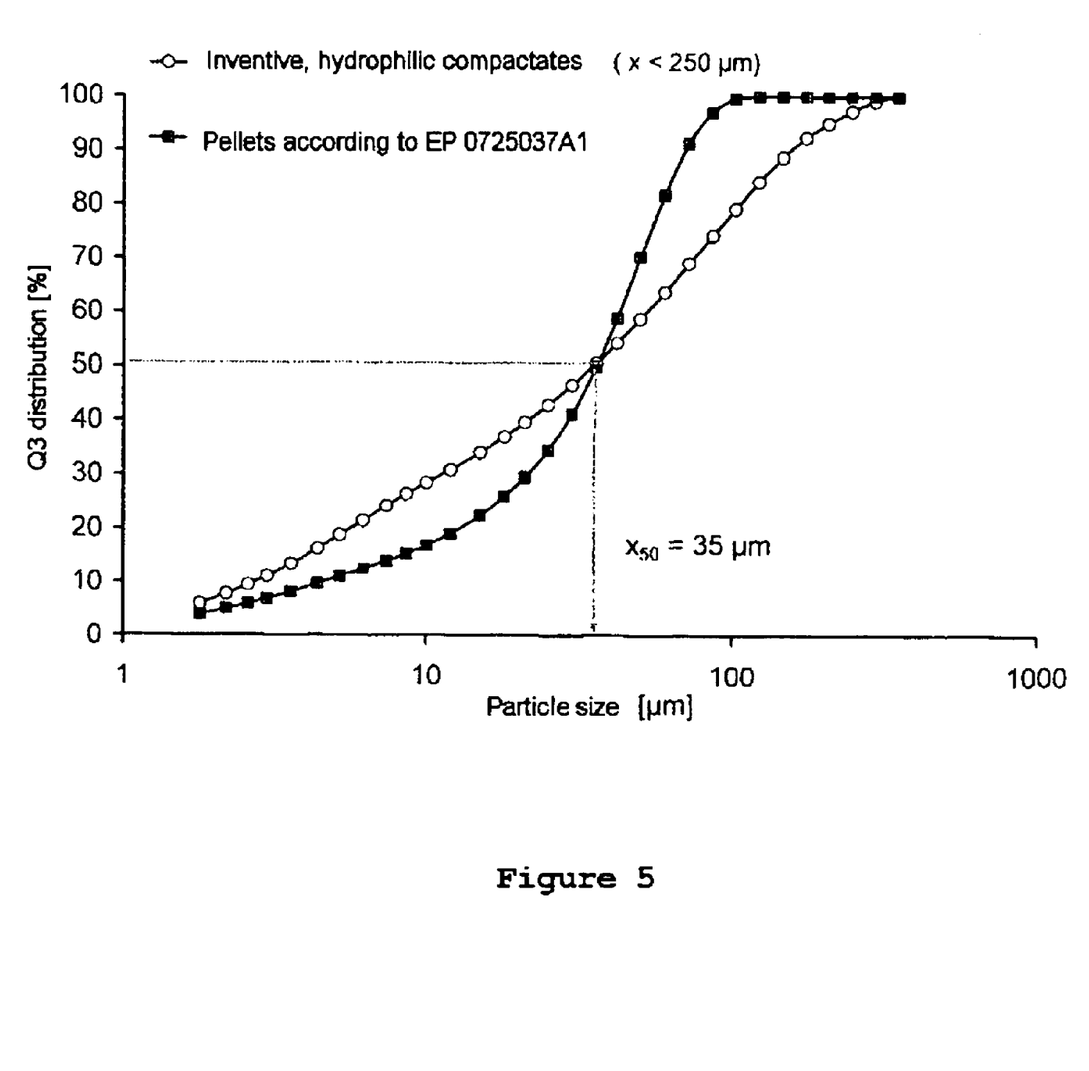
FIG. 5 is a graph of cumulative distribution versus particle size.

FIG. 5 shows the cumulative distribution (Q-3 distribution) of granulated materials according to EP 0 725 037 A1 and according to the invention.

The inventive crusts where X<250 μm have the same average particle size in laser diffraction spectroscopy as the granulated material according to EP 0 725 037 A1. In both cases it is ~35 μm.

The inventive crusts generate significantly less dust, however.

The fractions of the crusts were prepared via sieving granulation using a sieve of mesh width 500 μm and subsequent sieving on a 250 μm sieve. The fraction x<250 μm was the fine product in the sieving process. The fraction whose particle size was from 250 to 500 μm was the coarse product.

Figure 6:
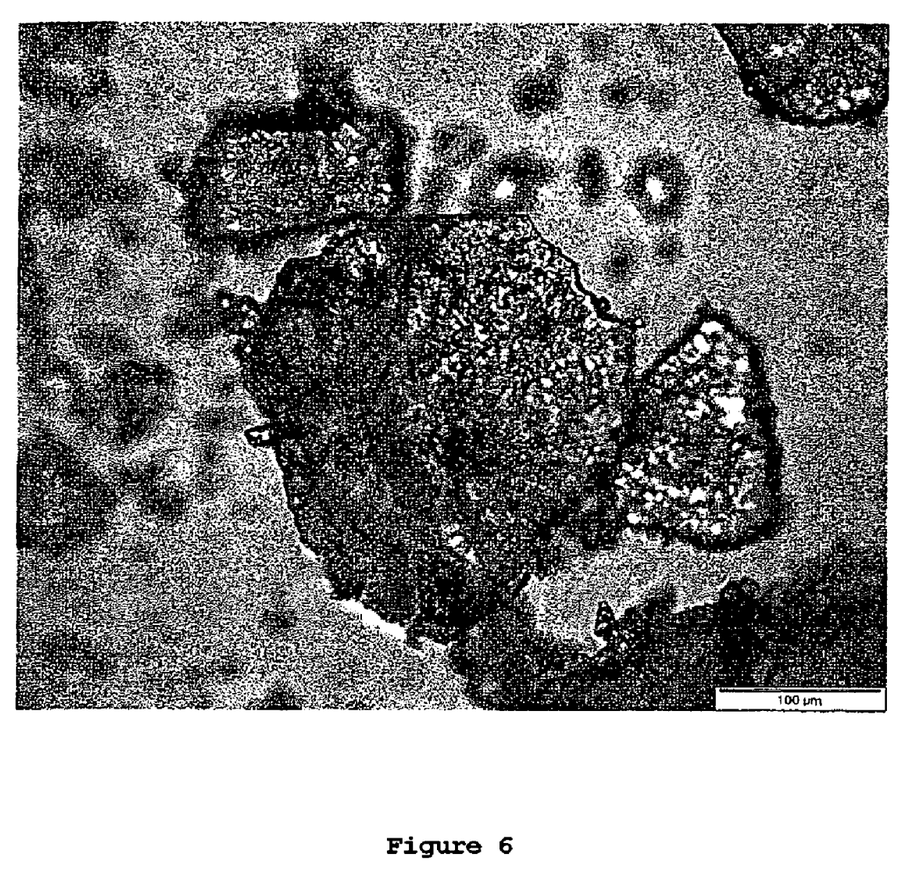
FIG. 6 shows the granulated silica of the invention.

FIG. 6 shows the granulated form of the pyrogenically prepared silicon dioxide inventively compacted to give crusts after breaking and sieving. It has an angled shape.

The granulated materials according to DE 19601415 have spherical appearance.

In one preferred embodiment of the invention, the tamped bulk density (to DIN EN ISO 787-11) of the crusts obtained is from 200 to 400 g/l. These crusts then have the necessary strength not to break apart again in the subsequent steps. However, they can be dispersed again readily.

The crusts obtained are moreover porous.

The inventive crusts have an advantageously low dust content after breaking, even without sieving or classification.

The agglomerate hardness of the inventive crusts is smaller than 50N, measured by ERWEKA 30.

The pyrogenically prepared silicon dioxide compacted to give crusts has, after sieving, no fines content with diameter smaller than 200 μm.

The pyrogenically prepared silicon dioxide inventively compacted to give crusts has a low dust content advantageous for all applications. It can be incorporated into mixtures without loss and without dust contamination.

Although the pyrogenically prepared silicon dioxide has been compacted, the inventive crusts have sufficient redispersibility for rubber mixtures. The redispersibility is not sufficient for use in silicone rubber compositions.

The pyrogenically prepared silicon dioxide inventively compacted to give crusts has no binder content.

The pyrogenically prepared silicon dioxide inventively compacted to give crusts can be used as filler in rubber mixtures.

The inventive crusts and a pyrogenically prepared silica subject to bulk-density increase according to EP 0 280 851 were incorporated into silicone polymer.

Formulation

Stage 1

100 parts, 400 g, of Silopren VS silicone polymer (Bayer AG)

40 parts, 160 g, of synthetic silica 6 parts, 24 g, of VP AC 3031 silicone oil processing aid (Bayer AG)

Stage 2

0.5% of Interox DCLBP-50-PSI bis(2,4-dichlorobenzoyl) peroxide (Peroxid-Chemie GmbH)

Mixing specification (Carried out at room temperature)

Polymix 200 U two-roll mill from Schwabenthan

| Roll diameter: | 200 mm |
|---|---|
| Roll length: | 400 mm |
| Nip: | 0.9 ± 0.05 mm |
| Rotation rate: | 20 rpm, friction: 1:1.3 |

Stage 1

400 g of silicone polymer are added to the two-roll mill.

As soon as a homogeneous milled sheet has formed on the operator roll (faster-running roll), the filler can be added. The silica is added slowly and in portions between the two rolls. After about 50% of filler addition, the compounded material is removed from the roll by the scraper and turned.

For the formulation with processing aid, this is now added to the two-roll mill in the form of a mixture of 24 g of processing aid in about 10 g of the silica (somewhat mixed by a spatula). The remaining 50% of the amount of filler are then added.

For dispersion and homogenization of the silica, milling is continued for a further 5 min after incorporation of the filler. During the process the mixture is turned 5 more times. The mixtures thus prepared are stored for 1 week to permit continued wetting of the silica. For this purpose, the compounded materials are wrapped in PE film.

Stage 2

For plastification, the compounded material is mixed on the roll mill until a homogeneous milled sheet is produced. The previously weighed-out amount of peroxide is then administered with a spatula (made of wood or plastic). Milling is continued for a further 8 min for dispersion and homogenization of the peroxide, the scraper being used here to remove the mixture from the roll and turn it 8 times.

Storage for 24 hours at room temperature (advantageously in PE film) then again follows.

Prior to vulcanization, the compounded material is again plasticized on the two-roll mill.

Vulcanization

The heating press is preheated to: 140° C.

Silicone sheets of thickness 2 mm (pressing time 7 min) and 6 mm (pressing time 10 min) are vulcanized in the preheated press between chromed steel plates.

In order to remove cleavage products of the peroxide, the sheets are post-vulcanized at 200° C. for 6 hours in a hot-air oven. In the 1st hour the oven door is opened for 60 seconds about every 10 minutes. In the 2nd and 3rd hour, every 30 minutes. Not more than 1200 g of vulcanisates are suspended in the ovens, whose volume is 0.125 m³.

TABLE 2

Dispersion coefficients, determined by means of surface topography

| | Aerosil$^R$ 200 Silicone rubber filler: | | | |
|---|---|---|---|---|
| Dispersion | Sample H Inventive crusts 1st measurement | Sample H Inventive crusts 2nd measurement | Sample J Subject to preliminary bulk-density increase according to EP0280851 1st measurement | Sample J Subject to preliminary bulk-density increase according to EP0280851 2nd measurement |
| Dispersion coefficient % | 72 | 73 | 96 | 97 |

It is apparent that the inventive crusts cannot be sufficiently dispersed in silicone polymer. They have relatively high strength.

Figure 8:
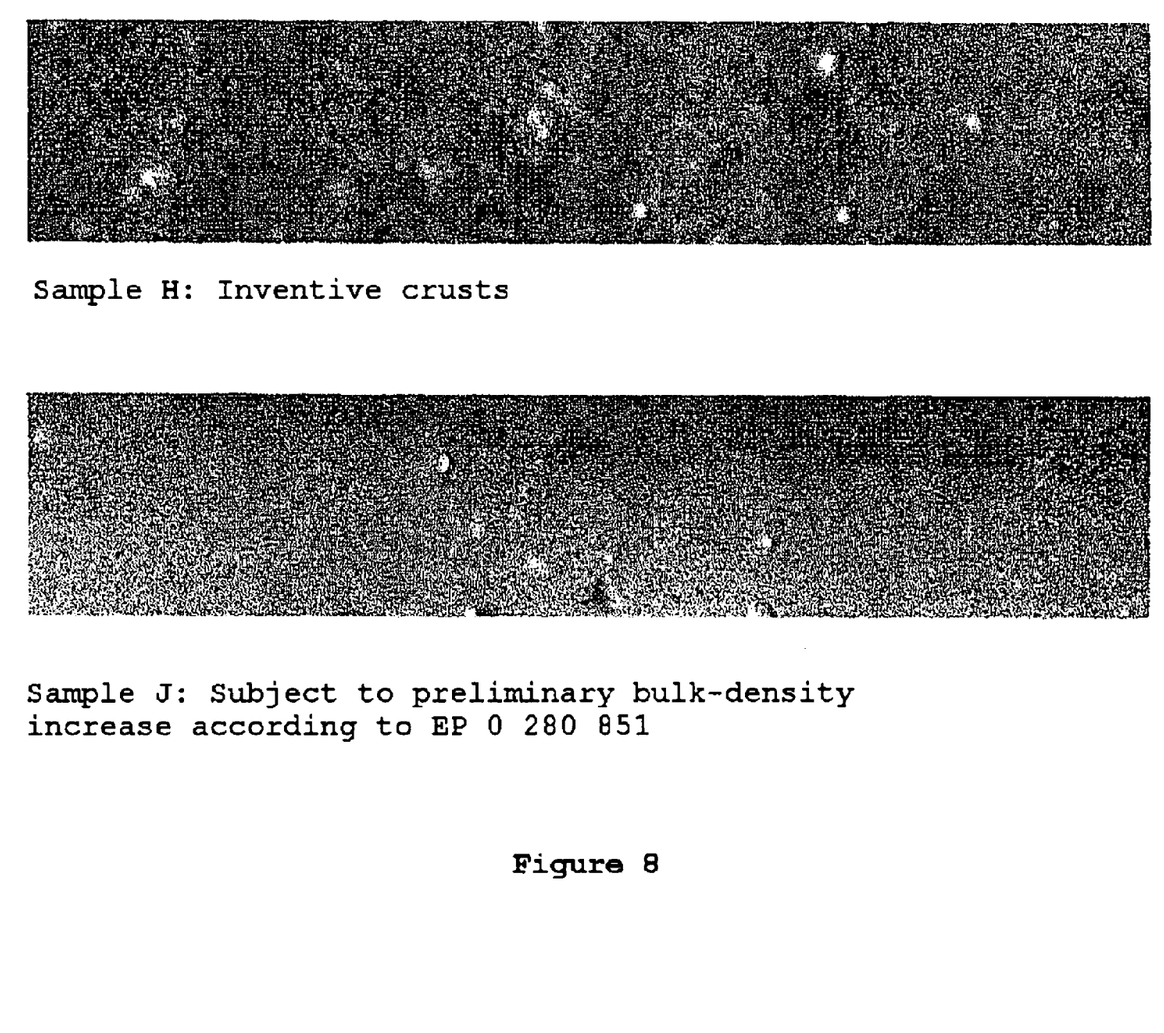
FIG. 8 shows the dispersion experiments in silicone polymer.

FIG. 8 shows the dispersion experiments in silicone polymer. Photographic-quality visualization of surface topography (described in: "Entwicklung eines Verfahrens zur Charakterisierung der Füllstoffdispersion in Gummimischungen mittels einer Oberflächentopographie" [Development of a method for characterizing filler dispersion in rubber mixtures by means of surface topography] A. Wehmeier; degree thesis 1998 at Munster Technology University, Steinfurt Division, Department of Chemical Engineering).

The invention claimed is:

1. Pyrogenically prepared silicon dioxide compacted to give crusts, characterized in that its tamped bulk density (to DIN EN ISO 787-11) is from 185 to 700 g/l.

2. Process for production of the pyrogenically prepared silicon dioxide according to claim 1 compacted to give crusts, comprising subjecting pyrogenically prepared silicon dioxide to preliminary de-aeration and bulk-density increase, compacting said silicon dioxide to give crusts, and breaking the crusts and optionally classifying broken crusts of silicon dioxide.

3. Process for production of the pyrogenically prepared silicon dioxide according to claim 2 compacted to give crusts, wherein the pyrogenically prepared silicon dioxide has been subject to preliminary bulk-density increase.

4. A rubber mixture comprising a rubber composition and the pyrogenically prepared silicon dioxide according to claim 1 compacted to give crusts.

5. The pyrogenically prepared silicon dioxide according to claim 1 which is a flowable product.

6. The pyrogenically prepared silicon dioxide according to claim 1 which has a tamped bulk density of 210 to 450 g/l.

* * * * *